(12) United States Patent
Rice et al.

(10) Patent No.: US 9,369,307 B2
(45) Date of Patent: Jun. 14, 2016

(54) OPTIMIZED SERVICE INTEGRATION

(75) Inventors: Joseph Allen Rice, Ballston Lake, NY (US); Brandon Matthew Castagna, Mount Holly, NC (US)

(73) Assignee: Bank of America Corporation, Charlotte, NC (US)

(*) Notice: Subject to any disclaimer, the term of this patent is extended or adjusted under 35 U.S.C. 154(b) by 652 days.

(21) Appl. No.: 13/547,716

(22) Filed: Jul. 12, 2012

(65) Prior Publication Data
US 2013/0019018 A1 Jan. 17, 2013

Related U.S. Application Data

(63) Continuation-in-part of application No. 13/181,145, filed on Jul. 12, 2011, now Pat. No. 8,719,919, and a continuation-in-part of application No. 13/181,141, filed on Jul. 12, 2011, and a continuation-in-part of application No. 13/181,151, filed on Jul. 12, 2011, now Pat. No. 8,448,237.

(51) Int. Cl.
*G06F 15/16* (2006.01)
*H04L 12/66* (2006.01)
*H04L 29/08* (2006.01)

(52) U.S. Cl.
CPC .............. *H04L 12/66* (2013.01); *H04L 67/16* (2013.01)

(58) Field of Classification Search
CPC ............................ H04L 12/66; H04L 67/16
USPC .......... 709/203, 223, 225, 229, 246; 726/1, 9
See application file for complete search history.

(56) References Cited

U.S. PATENT DOCUMENTS

| 7,418,457 | B2 | 8/2008 | Kaler et al. |
| 7,451,157 | B2 | 11/2008 | Kaler et al. |
| 7,721,322 | B2 | 5/2010 | Sastry et al. |
| 7,930,214 | B2 | 4/2011 | Knauerhase et al. |
| 7,957,994 | B2 | 6/2011 | Brown et al. |
| 7,979,379 | B2 | 7/2011 | Voegele et al. |
| 7,979,554 | B2 | 7/2011 | Ho et al. |

(Continued)

FOREIGN PATENT DOCUMENTS

WO 2012073027 A2 6/2012

OTHER PUBLICATIONS

International Search Report dated Aug. 28, 2013 in International Application No. PCT/US2013/046749.

(Continued)

*Primary Examiner* — Oanh Duong
(74) *Attorney, Agent, or Firm* — Banner & Witcoff, Ltd.; Michael A. Springs (57) ABSTRACT

An optimized service mediation framework may use customized tokens for reducing cost and latencies per transaction. In particular, a token service and an integration service may function together to generate customized tokens for use by network components within a transaction pathway. Each network component may access information with the token for a predetermined time period and/or for a predetermined number of service calls for service processing tasks related to mapping, security, governing, bridging, transforming, orchestrating, generating events, managing workloads, routing, validating, managing cache, encrypting, queuing and staging, commodity services, transaction management, and quality of service (QoS)/resiliency, among other things.

10 Claims, 7 Drawing Sheets

(56) References Cited

U.S. PATENT DOCUMENTS

| | | |
|---|---|---|
| 7,984,096 B2 | 7/2011 | Beoughter et al. |
| 8,020,051 B2 | 9/2011 | Ziegler |
| 8,041,760 B2 | 10/2011 | Mamou et al. |
| 8,051,430 B2 | 11/2011 | Rapp |
| 8,060,553 B2 | 11/2011 | Mamou et al. |
| 8,069,057 B2 | 11/2011 | Choubey et al. |
| 8,090,831 B2 | 1/2012 | Brauel et al. |
| 8,135,785 B2 | 3/2012 | Malladi et al. |
| 8,140,582 B2 | 3/2012 | Chen et al. |
| 8,140,615 B2 | 3/2012 | Miller et al. |
| 8,141,151 B2 | 3/2012 | Hunt et al. |
| 8,146,099 B2 | 3/2012 | Tkatch et al. |
| 8,156,140 B2 | 4/2012 | Roshen et al. |
| 8,156,179 B2 | 4/2012 | Parmar et al. |
| 8,161,500 B2 | 4/2012 | Tan et al. |
| 8,183,994 B2 | 5/2012 | Staab |
| 8,195,803 B2 | 6/2012 | Zhang et al. |
| 8,196,145 B2 | 6/2012 | Miller et al. |
| 8,370,312 B1 | 2/2013 | Sawhney et al. |
| 2001/0011250 A1 | 8/2001 | Paltenghe et al. |
| 2002/0133616 A1* | 9/2002 | Yoza et al. .............. 709/238 |
| 2002/0178254 A1 | 11/2002 | Brittenham |
| 2002/0188513 A1 | 12/2002 | Gil et al. |
| 2003/0074367 A1 | 4/2003 | Kaler et al. |
| 2003/0233451 A1* | 12/2003 | Ludvig et al. .............. 709/225 |
| 2004/0054919 A1* | 3/2004 | Duri et al. .............. 713/200 |
| 2004/0236633 A1 | 11/2004 | Knauerhase et al. |
| 2005/0144452 A1* | 6/2005 | Lynch et al. .............. 713/170 |
| 2005/0177602 A1 | 8/2005 | Kaler et al. |
| 2006/0020646 A1 | 1/2006 | Tee et al. |
| 2006/0041669 A1 | 2/2006 | Bemmel et al. |
| 2006/0123472 A1 | 6/2006 | Schmidt et al. |
| 2006/0130131 A1* | 6/2006 | Pai .............. H04L 63/0823 726/9 |
| 2006/0206517 A1* | 9/2006 | Hyder et al. .............. 707/102 |
| 2006/0282660 A1 | 12/2006 | Varghese et al. |
| 2007/0087727 A1* | 4/2007 | Tseitlin et al. .............. 455/406 |
| 2007/0118878 A1 | 5/2007 | Sastry et al. |
| 2008/0046335 A1 | 2/2008 | Zhou |
| 2008/0148345 A1* | 6/2008 | Rubio .............. G06F 21/31 726/1 |
| 2008/0313648 A1 | 12/2008 | Wang et al. |
| 2009/0070478 A1 | 3/2009 | Herman et al. |
| 2009/0251724 A1* | 10/2009 | Nakajima .............. 358/1.15 |
| 2010/0023491 A1 | 1/2010 | Huang |
| 2010/0333111 A1 | 12/2010 | Kothamasu et al. |
| 2011/0083171 A1* | 4/2011 | Lincoln et al. .............. 726/5 |
| 2011/0231921 A1 | 9/2011 | Narayanan et al. |
| 2011/0264865 A1 | 10/2011 | Mobarak et al. |
| 2012/0005740 A1* | 1/2012 | Wurth .............. 726/9 |
| 2012/0110199 A1 | 5/2012 | Mao et al. |
| 2012/0131660 A1* | 5/2012 | Dalzell et al. .............. 726/9 |
| 2012/0167186 A1* | 6/2012 | Dietrich .............. 726/6 |
| 2012/0254289 A1* | 10/2012 | Sathish .............. G06Q 30/0631 709/203 |

OTHER PUBLICATIONS

U.S. Final Office Action dated Aug. 28, 2013 in U.S. Appl. No. 13/181,145.

Office Action dated Oct. 15, 2012 from U.S. Appl. No. 13/181,145.

ISR & WO mailed Sep. 27, 2012 from PCT Application PCT/US12/45164.

Ludwig et al., "Catalog-based service request management", IMB Systems Journal, vol. 46, N. 3, Dec. 2007 (retrieved on Sep. 4, 2012), Retrieved from the internet http://citeseerx.ist.psu.edu.

Giordano, DNS-Based Discovery System in Service Oriented Programming, Advances in Grid Computing—EGC 2005, pp. 840-850, Springer-Verlag Berlin Heidelberg.

Callaway, AN Autonomic Service Delivery Platform for Service-Oriented Network Environments, Nov. 7, 2007, pp. 1-70, PHD Preliminary Examination, Department of Electrical and Computer Engineering, North Carolina State University.

Office Action dated Mar. 11, 2013 from U.S. Appl. No. 13/181,145.

Office Action dated Feb. 21, 2013 from U.S. Appl. No. 13/181,141.

Notice of Allowance dated Mar. 1, 2013 from U.S. Appl. No. 13/181,151.

Office Action dated Mar. 11, 2013 from U.S. Appl. No. 13/141,145.

Office Action dated Jun. 13, 2013 from U.S. Appl. No. 13/181,141.

Office Action dated Nov. 1, 2012 from U.S. Appl. No. 13/181,151.

\* cited by examiner

Trace Token (635)
- Requestor Application ID (637)
- Concrete Service Name (639)
- Concrete Operation Name (641)
- List of apps and timestamps Along the transaction path (643)

Service Token (609)
- Requestor Application ID (611)
- Provider Segment (613)
- Abstract Service Name (615)
- Abstract Operation Name (617)
- Rules Table (619)
- End-point (URL/Queue) (621)
- Concrete Service Name (623)
- Concrete Operation Name (625)
- Time to live (seconds) (627)
- Refresh time (seconds) (629)
- Usage Limit (invocations) (631)
- Timeout (milliseconds) (633)

End-to-end Token (601)
- Original Requestor ID (603)
- Requestor Channel Code (605)
- Gateway Segment (607)

FIG. 6

OPTIMIZED SERVICE INTEGRATION

CROSS REFERENCE TO RELATED APPLICATIONS

This application is a continuation-in-part of U.S. application Ser. No. 13/181,145 filed on Jul. 12, 2011, and entitled "Service Mediation Framework." This application is also a continuation-in-part of U.S. application Ser. No. 13/181,141 filed on Jul. 12, 2011 and entitled "Dynamic Provisioning of Service Requests." This application is also a continuation-in-part of U.S. application Ser. No. 13/181,151 filed on Jul. 12, 2011 and entitled "Virtual Private Internet." All three of these applications are herein incorporated by reference in their entirety.

TECHNICAL FIELD

Aspects of the invention generally relate to an optimized implementation of service integration via the use of extensible tokens. Each component of a network may use these tokens to perform common service processing tasks driven by standardized service policies that may be managed in a centralized repository.

BACKGROUND

The Internet provides ubiquitous connectivity that is quick, open, and enables clear communication and exchange of ideas. Unfortunately, the Internet is not secure enough for many confidential, proprietary exchanges that occur within private networks such as those maintained by corporations, schools, governmental agencies, and the like.

A private network (e.g., a corporate network) utilizes encryption to create a protected network that is secure. However, a private network is not open enough and instead creates barriers to agility. In particular, services within a private network are routed and accessed by point-to-point connections that are customized for each service. When changes need to be made to how services are provisioned and/or when new services need to be offered, there is no central place to advertise or manage access to the changes and/or new services. There is also no consistent way to connect users to each service in a secure, reliable and easy-to-provision way.

Today, in large corporations, there are tens of thousands of servers that function as hard-wired and hand-configured components. Under this scenario, it is very difficult to connect together a system that provides adequate speed, security, agility, and extensibility. In particular, this network configuration makes organizing cross-connectivity and integration across groups of people in a corporation challenging.

Moreover, network processes in private networks are implemented manually and in an ad-hoc way using information technology (IT) systems for performing steps such as defining, designing, procuring, building, developing, testing, promoting, certifying, and launching physical servers, network connectivity, and/or security capabilities. To implement these processes, conventional networks within an organization such as a corporation include tightly coupled layers of network components, manual configurations, and/or embedded code.

Increasingly, businesses need the ability to deploy IT systems in a fast, robust, secure, and extensible way. Moreover, services within and across business domains need to be connected in a governed and agile way.

Therefore, there is a need for a network implementation that would allow network components within a private network (e.g., corporate network, and the like) to have the same ease of connectivity as the Internet but also allow the ability to enforce policies and security as in a private network

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for implementing common tasks such as security, content-based routing, logging, message format translation, and protocol bridging via extensible tokens within a private network. This scheme may be implemented by using tokens that are valid for predetermined time intervals and conditions to reduce the latencies and cost per transaction within a service mediation framework.

Other aspects of the disclosure relate to an enhanced service DNS server which may resolve service uniform resource locators (URLs) into service addresses, an enhanced service router that may be configured to interpret the services being called and to route the requests in a way that delivers the best quality of service, an enhanced service repository that may serve as a secure, central, easy-to-use storage device to discover and publish new services or content within a private network, and an enhanced service gateway that may aid in deploying and registering services.

Yet other aspects of the disclosure relate to an optimized service mediation framework that allows devices within a network to communicate with one another in a standardized format and handle service requests via extensible tokens.

Aspects of the disclosure may be provided in a computer-readable medium having computer-executable instructions to perform one or more of the process steps described herein.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there is a need for entities to deliver services and/or products better, faster, and cheaper in a way that allows for high availability, maximizing flexibility, and improving speed to market. The islands of infrastructure common in today's network systems need to be changed into networks that deliver composite services across business domain boundaries.

Figure 1:
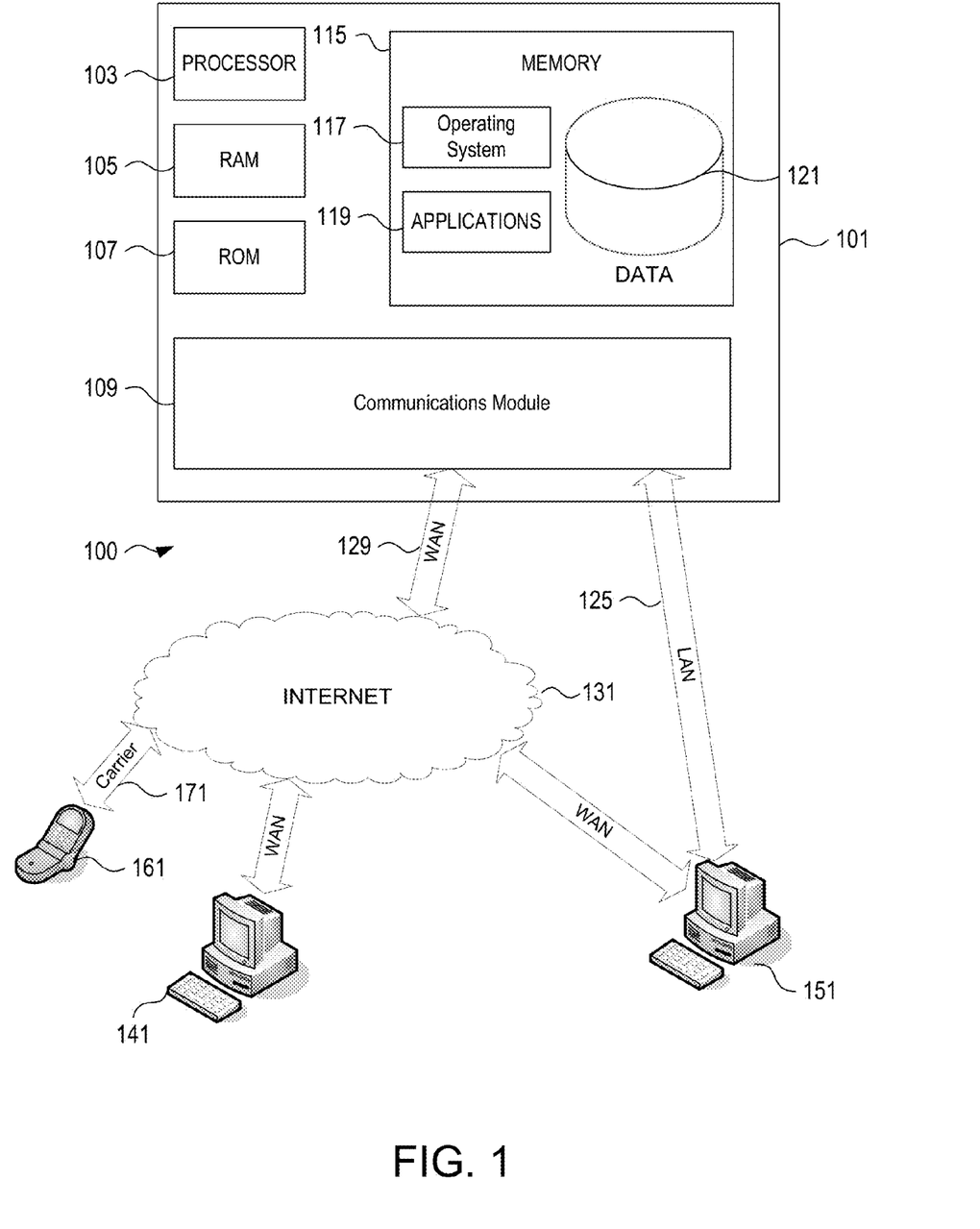
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include an enhanced network services device 101 wherein the processes discussed herein may be implemented. The enhanced network services device 101 may have a processor 103 for controlling overall operation of the enhanced network services device 101 and its associated components, including random-access memory (RAM) 105, read-only memory (ROM) 107, communications module 109, and memory 115. Processor 103 and its associated components may allow the enhanced network services device 101 to run a series of computer-readable instructions related to providing common service functions such as security, routing, and logging of messages by accessing information stored in an extensible token. Processor 103 may also direct enhanced network services device 101 to perform tasks such as orchestration, message format translation, and protocol bridging within a private network.

Enhanced network services device 101 typically includes a variety of computer readable media. Computer readable media may be any available media that may be accessed by enhanced network services device 101 and include both volatile and nonvolatile media, removable and non-removable media. By way of example, and not limitation, computer-readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by enhanced network services device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, data, and the like to digital files.

Although not shown, RAM 105 may include one or more applications representing the application data stored in RAM 105 while the enhanced network services device 101 is on and corresponding software applications (e.g., software tasks) are running on the enhanced network services device 101.

Communications module 109 may include a microphone, keypad, touch screen, and/or stylus through which a user of enhanced network services device 101 may provide input, and may also include one or more of a speaker for providing audio output and a video display device for providing textual, audiovisual and/or graphical output.

Software may be stored within memory 115 and/or storage to provide instructions to processor 103 for enabling enhanced network services device 101 to perform various functions. For example, memory 115 may store software used by the enhanced network services device 101, such as an operating system 117, application programs 119, and an associated database 121. Also, some or all of the computer executable instructions for enhanced network services device 101 may be embodied in hardware or firmware.

Enhanced network services device 101 may operate in a networked environment supporting connections to one or more remote computing devices, such as computing devices 141, 151, and 161. The computing devices 141, 151, and 161 may be personal computing devices or servers that include many or all of the elements described above relative to the enhanced network services device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, enhanced network services device 101 may be connected to the LAN 125 through a network interface or adapter in the communications module 109. When used in a WAN networking environment, the enhanced network services device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the enhanced network services device 101, according to an illustrative embodiment, may include computer executable instructions for invoking functionality related to communication including, for example, email, short message service (SMS), and voice input and speech recognition applications (e.g., for transmitting service request information and/or receiving service responses, and the like). In addition, the application programs 119 may include computer executable instructions for invoking user functionality related to accessing a centralized repository for performing various service tasks like routing, logging, and protocol bridging.

Embodiments of the disclosure may include forms of computer-readable media. Computer-readable media include any available media that can be accessed by an enhanced network services device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor 103 on enhanced network services device 101. Such a processor may execute computer-executable instructions stored on a computer-readable medium.

Figure 2:
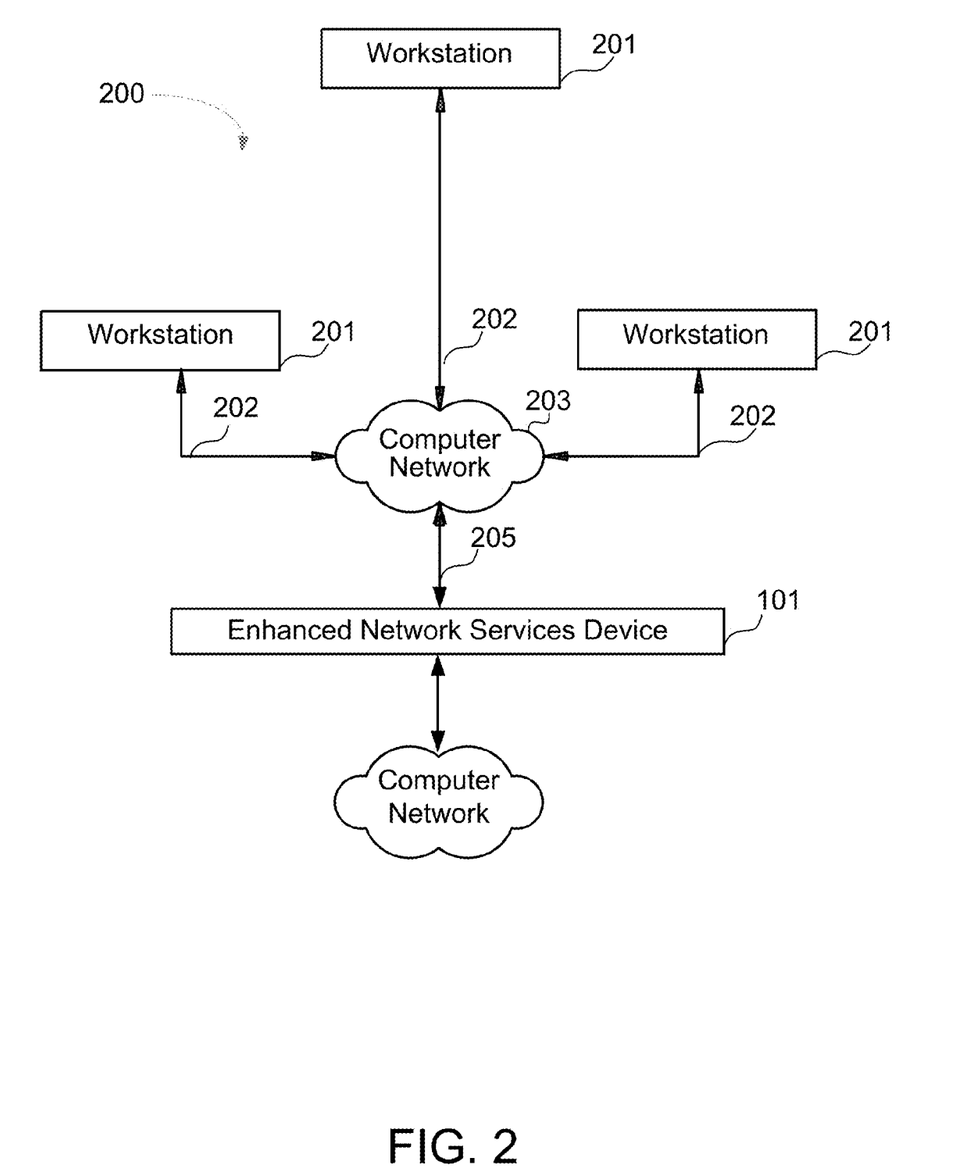
FIG. 2 is an illustrative block diagram of workstations and servers that may be used to implement the processes and functions of one or more aspects of the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to enhanced network services device 101. Workstations 201 may include many of the same hardware/software components as enhanced network services device 101. In some embodiments, workstations 201 may represent data stores for storing service policy data and metadata used by enhanced network services device 101. In other embodiments, workstations 201 may represent various types of enhanced network services devices 101 within network 200, including a device offering an integration service, a device offering a token service, an enhanced service DNS server, enhanced service router, enhanced service repository, and/or an enhanced service gateway. In system 200, enhanced network services device 101 may be any suitable server, processor, computer, or data processing device, or combination of the same. Enhanced network services device 101 may be used to process the instructions received from one or more users or one or more other devices (e.g., workstations 201).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced network services device 101, such as network links, dial-up links, wireless links, hard-wired links, and the like.

The steps that follow in the Figures may be implemented by one or more of the components in FIGS. 1 and 2 and/or other components, including other computing devices.

In accordance with various aspects of the disclosure, methods, computer-readable media, and apparatuses are disclosed that allow an entity, such as a company, government agency, university, and the like, to implement advanced methodologies for the creation of a framework that may allow network components to receive service policy information in a standardized format from a centralized repository. In general, within the framework, the content of various messages and/or tokens associated with service requests transported within the network may drive the integration of the network components. The data within a message and/or token may be used to describe how a message may need to be processed by any one of the network components. The framework may define common functions such that any vendor or technology implementation within the network will be the same. The framework may facilitate standard network tasks such as routing, authentication, authorization, auditing, and transformations. These tasks may be executed dynamically based on the content of the message/token.

As used herein, a service request may relate to a variety of services provided by the network maintained by an organization. For instance, if the organization is a bank, the network maintained by the bank may provide services such as opening a bank account, registering for a credit card, and/or applying for a loan.

Each network component within the service framework may possess enhanced features that allow the component to access a datastore of detailed service policy metadata and data and implement service functions based on the service policy metadata/data. For instance, when the enhanced network services device 101 is an enhanced service router and/or an enhanced service DNS server, the device 101 may access routing policy information to determine a service address of a service provider and/or service routing policy information to transmit the service request to a preferred service provider of the requested service. In addition, when the enhanced network services device 101 is an enhanced service gateway, the device 101 may access and implement other types of service policy information, such as those related to security (e.g., authentication and/or authorization), protocol bridging, and format translation. Moreover, when the enhanced network services device 101 is a service repository, the device 101 may store and/or export service policy data/metadata in a common format (e.g., based on a standard) and may include information on all of the common service policies commonly used within a private network. When the enhanced network services device 101 is a device offering an integration service, device 101 may analyze information associated with a service request to populate fields of a customized token for use by other network components. In addition, when the enhanced network services device 101 is a device offering a token service, device 101 may generate and digitally sign tokens for use by network components.

Figure 3:
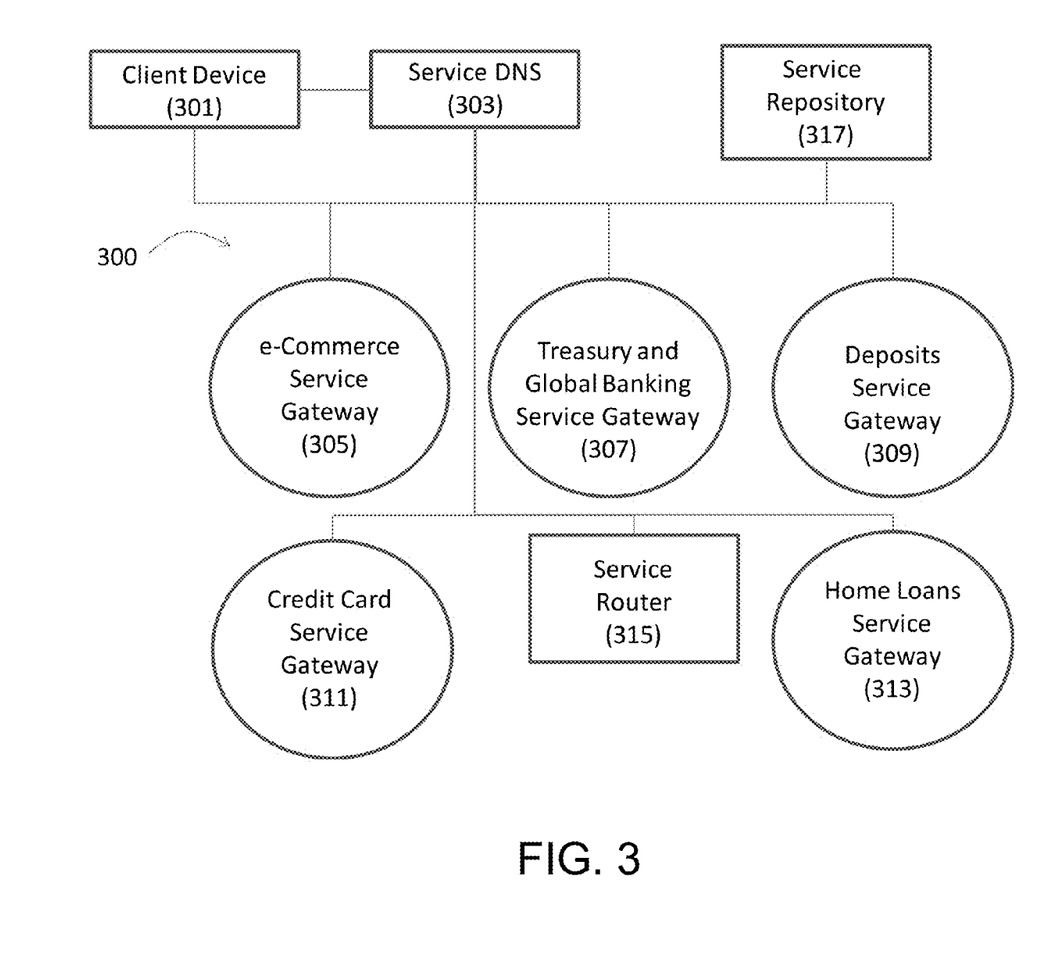
FIG. 3 shows an example network within an organization such as a bank that includes various service mediation framework devices for handling data communicated within the network, in accordance with at least one aspect of the disclosure.

FIG. 3 shows an example network 300 within an organization such as a bank that includes various service mediation framework devices for handling data communicated within the network 300, in accordance with certain aspects of the disclosure. Various departments with the bank may communicate over network 300 and each department may have its own enhanced service gateway. For example, FIG. 3 shows an enhanced service gateway for an e-Commerce department 305, treasury and global banking department 307, deposits department 309, credit card department 311, and home loans department 313. One of ordinary skill in the art would recognize that each of the service gateways 305-313 may in fact be a cluster of service gateways 305-313 located within each bank department.

In the network 300, a client device 301 (e.g., user terminal, network server, and the like) within the bank may request a service in a variety of ways, including by a user inputting a service uniform resource locator (URL) into a browser running on device 301 and/or through a message transmitted from the client device 301. In some embodiments, client device 301 may actually represent multiple client devices 301. When a user of client device 301 initiates a web service by inputting a service URL into a browser, the service request may be transmitted to an enhanced DNS server 303, and the enhanced service DNS server 303 may resolve the service URL (e.g., the URL of a service provider) into a service address of a service provider for the service URL. For example, a service URL for accessing sports content may be "sports," meaning that a user may access a preferred service provider for sports content within a private network by typing in the word "sports" into a browser. Similarly, the service URL for accessing the latest news content may be "news," and the service URL for accessing the latest weather information may be "weather." One of ordinary skill in the art would recognize that alternative naming conventions may be used to designate a service URL.

In general, a service request may represent a higher order construct that specifies a desired resource. For instance, if a user initiates a service request for "sports," the enhanced service DNS server 303 may access policy definition metadata stored on an enhanced service repository 317 that specifies a particular sports content provider. If the same user initiates this service request at a later date, the policy definition metadata for this service request may have changed during the interim; if so, the enhanced service DNS server 303 may access policy definition metadata that specifies that the service request for "sports" should be routed to a different sports content provider.

Other types of service requests may not involve a user-web service interaction; these service requests may be communicated directly between different network components. These server-server service interactions may involve various network resources (e.g., enhanced service gateways 305-313, enhanced service router 315, and the like) and may request that a service provider (e.g., one of the servers within the network) perform various network service tasks (e.g., authentication, logging, format translation, and the like) for a service requestor server. Similar to the user-web service interaction described in the previous paragraph, the service requestor (e.g., enhanced service router 315, enhanced service gateways 305-313, and the like) may access relevant service policy information stored in enhanced service repository 317 to perform the requested service. Also, as before, the service requestor may access and implement a service task that is consistent with the latest version of the service policy information stored in enhanced service repository 317.

In general, when the service request is a web-based browser interaction, the request may first be routed to an enhanced service DNS server 303 within the bank network 300, which may access routing policy metadata and data for the service request from the enhanced service repository 317. In some aspects, the enhanced service repository 317 may export a file including the routing policy information in Extensible Markup Language (XML) format to the enhanced service DNS server 303. Once the enhanced service DNS server 303 obtains the routing information (e.g., a destination service address), server 303 may route the service request to an appropriate enhanced service gateway 305-313 that may handle the service request.

For server-server service interactions, when a client device 301 requests a service, the service request may not be first routed to the enhanced service DNS server 303. Instead, these service requests may be routed directly to an enhanced service router 315 and/or enhanced service gateways 305-313 (discussed further below). For instance, the service router 315 may aid in routing a service request to a predetermined queue for any message-oriented middleware.

In the process of routing the service request to one or more enhanced service gateways 305-313, the service request may also be routed to enhanced service router 315, which may also aid in routing the service request to an appropriate destination (e.g., across firewalls, and the like). In conventional systems, to access a service, a user must select a conventional URL on a web browser to call a web page. When the URL is selected, the user is connected to a single backend system (e.g., the service provider server) based on the URL. The enhanced service router 315, on the other hand, may allow a client device 301 to request a service using content-based routing. With this approach, instead of always using the same route to connect to a service provider or instead of using the same service provider to handle a given type of service request, the enhanced service router 315 may access routing policy metadata and data in enhanced service repository 317 to dynamically determine the best possible route and/or the best possible service provider for a given service request at the time that the service request is made. For instance, one service provider may be better than another service provider because of lower cost associated with providing the service.

Each of the enhanced service gateways 305-313 and the enhanced service router 315 may access metadata and data stored in enhanced service repository 317 to determine relevant policies that may need to be enforced on the service request. In some aspects, each of the components 301-317 within network 300 may be appliances configured to receive/transmit data from/to any other component 301-317 in XML format, among other formats. In addition, each appliance may be configured to employ Extensible Stylesheet Language Transformations (XSLT) to allow one appliance to communicate with another appliance in a standard format.

Once the service request is routed to the appropriate destination (e.g., one of the enhanced service gateways 305-313), one of the enhanced service gateways 305-313 may transmit an appropriate response back to client device 301. Once again, in order to route the response to the service request back to client device 301, one of the enhanced service gateways 305-313 may access routing policy information from service repository 317.

In some aspects, the information stored within the enhanced service repository 317 may be updated periodically when the need arises. For instance, when a new service comes online within one of the departments within the bank, a set of policies governing that service may be added to enhanced service repository 317. Similarly, information within the enhanced service repository 317 may be updated when a service needs to be routed differently (e.g., because an older service URL has now become inactivated, and the like). In this way, the implementation of service policies may be automated and data-driven rather than driven through manual intervention.

The enhanced service gateways 305-313 may be configured to control a variety of service policies. Just as the enhanced service DNS server 303 and the enhanced service router 315 may access and implement routing policies by accessing policy metadata and data from the enhanced service repository 317, the enhanced service gateways 305-313 may access and implement other service policies stored in enhanced service repository 317, as outlined below.

The enhanced service repository 317 may store data related to operational (e.g., run-time) policies such as those relating to mapping, security, governing, bridging, transforming, orchestrating, generating events, managing workloads, routing, validating, managing cache, encrypting, queuing and staging, commodity services, transaction management, and quality of service (QoS)/resiliency, among other things, for use/access by any network component. Policies related to mapping may involve mapping abstract service names to concrete service names based on information within a service request (e.g., mapping an easy-to-understand term to a complex information technology (IT) function, operation, and/or endpoint, and the like). Policies related to security may include details on security functions such as authentication (e.g., establishing identity through a credential), authorization (e.g., determining if access is authorized for a privileged resource), and auditing of services and/or service requests.

Meanwhile, policies related to governing may describe various methodologies for policy enforcement (e.g., at runtime and the like). For instance, policies may be enforced at various levels such as at the contract/client-operation level, option level, quality of service (QoS) or service level management (SLM) level, audit level, and/or the user level. Consider a scenario where bank is trying to open a new credit card account for a user. A policy enforced by contract/client operation may dictate that only those authorized persons in the credit card department of the bank may request to open a bank account. In other words, authorized personnel in the credit card department may possess a "contract" that allows them to request the client operation of opening a credit card account. Enforcing a policy at an option level may allow for control of service requests at a more granular level. For instance, a policy may specify options of how to open a variable interest rate credit card account or a fixed interest rate credit card account. In addition, a policy enforced at the QoS and/or SLM level relates to controlling concurrency and/or timeouts by client, provider, operation, contract, or option. For instance, a policy enforced at the QoS and/or SLM level may specify how many authorized personnel in the credit card department in one branch location may request to open a credit card account at the same time. Another policy enforced at the QoS and/or SLM level may specify the frequency and/or duration with which a given bank employee may request to open a credit card account for a customer.

In addition, a policy enforced at the audit level may relate to capturing data needed for triage or for rejected requests. For instance, a policy enforced at the audit level may specify how to notify (e.g., immediately, via a phone call, and the like) a customer when a wire transfer over a predetermined threshold value fails. Finally, a policy enforced at the user level may specify how different users should be treated differently. For example, a bank customer who is a high net worth individual may obtain a higher level of service (e.g., more prompt service, and the like) than an upper middle class individual, and user policies may specify these differences in service level for the two types of individuals.

Policies related to bridging may govern conversion of protocols and/or credentials so that they are compatible with one another (e.g., to allow one application to communicate with another). For instance, bridging policies may allow for compatibility between various types of credentials such as certificates (X.509 and the like) and tokens (e.g., tokens based on the Security Assertion Markup Language (SAML), OAuth, and the like). In addition, bridging policies may allow for converting data between various types of protocols such as Simple Mail Transfer Protocol (SMTP), Hypertext Transfer Protocol (HTTP), File Transfer Protocol (FTP), Short Message Service (SMS), and the like.

Policies related to transforming may govern translation of data from one format (e.g., Simple Object Access Protocol (SOAP), fixed positional format that delimits fields, variable delimited format such as those that use commas to separate fields, industry standard formats, custom formats, and the like) to another. In yet other embodiments, policies in this category may also relate to enriching (e.g., adding/supplementing) data/messages and/or filtering (e.g., removing a few fields/characters) data/messages. Policies related to filtering may define techniques (e.g., via style sheet filters, and the like) to strip away information that is not needed in a service transaction. For instance, if a network is providing a service related to obtaining a credit card, a filtering policy may specify that confidential and/or sensitive information such as the social security number of the service requestor be removed from the service request before transmitting the service request to a company that prints credit cards.

Policies related to orchestration (e.g., business process management) may govern how multiple messages are split/merged and how complicated service requests may be divided into sub-requests. In some embodiments, business process management policies may describe orchestration of discrete services into a composite service. These policies may also govern process choreography (e.g., creating a workflow or sequence of steps) and complex event processing (e.g., analyzing a pattern/trend of events and making conclusions based on the pattern/trend to take an action).

Policies related to generating events may govern handling of performance logging, error logging, alerts, fraud events, and business events. Performance logging may relate to measuring, logging, and displaying (e.g., asynchronously so that these steps do not interfere with a transaction/message) the performance of any transaction or message so that users may track the performance. Meanwhile, error logging may relate to recording error messages for triage. Policies related to alerts may govern how, when, and under what protocol (e.g., Simple Network Management Protocol (SNMP), and the like) alerts are generated for a variety of different events, including usage (e.g., for detailing how often a certain service is being used) and availability (e.g., for detailing the availability of a given service provider). Policies related to fraud events may detail how fraud events (e.g., unauthorized accessing of an account, and the like) are detected and logged. Finally, policies related to business events may detail how sales opportunities within an entity such as a company are generated, logged, and analyzed to determine if there are future sales opportunities for the entity. In general, policies related to logging may include information on when to log data (e.g., when a service request is made to measure performance metrics of the network such as the amount of time that the network takes to fulfill the service request, when access to a privileged network resource is granted or denied, when fraud is committed on the network, and the like).

Policies related to workload management may govern how workloads are distributed across multiple devices within a network (e.g., through load balancing). In other words, policies related to workload management may include information on how many and which network components may participate in responding to a service request (connection distribution, local load balancing, virtual machine (VM) level workload management, and the like). These policies may include those related to load balancing of incoming service requests (e.g., via self-balancing of workloads to distribute workloads to peer devices) or load balancing of outgoing service requests (e.g., based on a list of load balancer groups or endpoints, based on instances of Java virtual machines (JVMs), and the like).

Policies related to routing may govern various types of routing mechanisms in a service-oriented architecture, including fixed routing, content-driven routing, and context-driven (e.g., cost, availability and the like) routing. Policies related to fixed routing may allow for a one-to-one mapping for each service request (e.g., a single destination for each request). Meanwhile, policies related to content-driven routing may allow for profiling of content within each request to determine a destination. Finally, context-based routing may allow for routing requests based on dynamically evaluating criteria such as cost, availability, and performance (e.g., response time) of various service providers.

In general, policies related to routing may define how to decide where to route a given service request or a response to a service request (e.g., DNS/QUEUE resolution, site selection, content or context based routing, and the like). The service mediation framework may employ a sophisticated and dynamic means of routing a message which is ultimately decoupled from the mediation logic. For a given service, there may be distinct data-types which may be marshaled from consumer to one or more providers. For any given service, there may be a single canonical data type on which the service may route the message. Across multiple services, there may be multiple canonicals which may be employed to facilitate normalization of data from service consumer to service provider. To maximize reuse, common routing implementations (or strategies) may need to be defined which work across all services with varying canonical data-types. Furthermore, different routing strategies may utilize varied logical parameters depending on the business requirement.

To facilitate dynamic content-based routing across this diverse system, each routing strategy may contain a capability to support multiple data formats. In this implementation, the service may contain a reference to a strategy. After mediating to the service canonical, the service mediation framework may pass the underlying canonical message to the strategy. Based on the type of message, the routing strategy may contain metadata for extracting logical routing fields from the specific payload content based on the data-type. Once the varied routing formats are normalized through the logical routing field extraction process, the routing strategy may execute the business logic to determine the service provider to which the message needs to be routed.

For instance, an example of context-based routing or decisioning, triggered by a run-time context, includes cost/performance-based routing (based on comparative costs per transaction and availability to lower-cost cloud computing versus higher cost and more resilient internal services on an entity controlled network). In this example, a service request may be routed in network 300 based on the lowest cost provider that meets the minimum availability and performance service level agreements (SLAs) for each request type. Another example of context-based routing or decisioning, triggered by a run-time context, includes value-based service level management, where the business value (transaction amount or business impact of failure) for each transaction type (or service request type) may be coded as metadata in enhanced service repository 317 and is used to determine which transactions (or requests) may be guaranteed processing and which may be throttled or redirected when resources become constrained or demand exceeds rated capacity. Yet another example of context-based routing or decisioning, triggered by a run-time context, includes resource-based timing, where the amount of resources (e.g., threads, memory, connections, timeout values, and the like) may be allocated based on granular measurements of available resources by provider and service type. A final example of context-based routing or decisioning, triggered by a run-time context, may include the use of alternate path triggers. In this example, when virtual machine workload management is configured, a service gateway 305-313 may determine that only some traffic may be served using dynamic content (from the active service provider virtual machine instances). Service gateways 305-313 may then route excess traffic to alternate internal service providers or adjust cache parameters in the message response header to trigger service of some requests via cached content that is still relevant but aged to a greater degree until demand subsides or additional dynamic service providers become available or more responsive.

In general, the ability of an enhanced service repository 317 to define significant triggers (driven by environment or run-time context) and to render resultant actions in a common way (e.g., XML) which may be acted upon by a diverse set of vendor tools throughout the network or even across multiple divisional or corporate boundaries may represent a breakthrough extension of federated connectivity and service management.

Policies related to validating may include those that validate files such as those written in Extensible Markup Language (XML), validate a schema of a service request (e.g., reject malformed request formats that do not conform to a prescribed format), and validate against a broad range of other threats (e.g., Structured Query Language (SQL) injection, distributed denial of service (DDoS), cross-site scripting, recursion attacks, and the like).

Policies related to managing cache may govern various types of caching methodologies (e.g., based on representational state transfer (REST), based on Hypertext Markup Language (HTML) objects, based on web services, and the like). Polices that govern REST-based caches (e.g., those that allow standard integration for name/value pairs of content) may enable stateless integration without losing the state across a cluster, policies that govern caching based on HTML objects may enable standard HTML and image caching, and policies that govern web service level caching may enable service and database caching to reduce backend service calls and/or database reads.

Policies related to encrypting may govern various types of encryption (e.g., coding) methodologies, such as encryption at the transport layer (e.g., creation of a tunnel and encryption of data that is transported through the tunnel), encryption at the field level (e.g., encryption of data elements for Payment Card Industry (PCI) compliance), and encryption via a hardware security module (HSM) (e.g., to store private keys used for encryption to deliver Federal Information Processing Service (FIPS) level 2 and/or 3).

Policies related to queuing and staging may govern various communication methodologies, including publication/subscription (e.g., for creating a one-to-many publication path involving creation and updating of topics so that those that subscribe to a given topic receive the updates), request/response (e.g., transmitting a message and receiving a response), datagrams (e.g., one way communication), asynchronous communication (e.g., receiving a response anytime (e.g., without waiting) in the future after a request is sent, synchronous communication (e.g., waiting for a response to be received immediately after a request is sent), and messaging (e.g., delivering a string of messages stored in a queue when appropriate).

Policies related to commodity services may govern log services and token services. Policies related to log services may enable recording of performance data, audit data, business events, fraud data, and the like onto a disk. Policies related to a token service may enable issuance of tokens in a predetermined format with predetermined fields to protect the tokens from tampering and to realize integration as a service.

Policies related to transaction management may specify details about transactions, such as whether a unit of work (UOW) can be defined (e.g., defining a set of required steps for a transaction to occur) and how each step of the transaction should be rolled back (e.g., undone) if any one of the steps in the transaction fail to occur.

Policies related to QoS/resiliency may govern service level agreements (SLAs) (e.g., determining if a service provider is meeting a predetermined service level such as a time expectation for performing a service, taking actions based on whether a service provider is meeting or not meeting the predetermined service level), timeouts (e.g., waiting for a predetermined amount of time for an event to occur and releasing resources required for the wait even if the event has not occurred after the predetermined amount of time has elapsed), and sliding timers (e.g., a method to vary the wait time for an event to occur based on various factors).

In a typical multinational firm or federated enterprise that spans many large divisions, there may be multiple distributed information repositories (e.g., enhanced service repositories 317). Each may use a different vendor solution for storing and managing services or integration flows or connections. By including an integrated metadata repository (e.g., enhanced service repository 317), network 300 may have the flexibility to store and manage service or connectivity-related metadata (such as service or operation names, Web Services Description Language (WSDL) or interface details, authentication credentials, authorization credentials, authorization contracts or entitlements (either at the user or system level), triggers for actions such as logging, service level management and throttling, and multi-factor content-based routing, end-point and load balancer details, transformation and orchestration logic or rules, service-bus or segment mapping or other decisioning criteria) across this flexible array of departmental or divisional repositories while still being able to federate into a common repository that can normalize the information via a common application programming interface (API) or file interface specification and translate the enterprise view of the design-time data into run-time flows, routes or policies that can be enforced or executed in real-time as part of the cross-vendor service mediation framework (potentially interfacing to off-premise resources or entities via a virtual private internet connectivity.)

As an example, assume that a multi-division bank stores web service information in each division using division specific repositories (e.g., enhanced service repositories 317). In this example, division A may use a first commercially available repository, division B may use a second commercially available repository, division C may use a home-grown repository, and division D may use a third commercially available repository. All of this service metadata may be integrated/imported using a common repository with a common interface or file format (e.g., a common API). This federated data may drive enterprise level reports showing holistic cross-divisional service interactions. The enterprise metadata may be used to create XML-formatted control files that enable any node of the network (comprising a vast array of diverse vendor tools configured to act as service mediation framework components such as service routers 315 or service gateways 305-313). This implementation may transform what used to be thousands of independent and uncoordinated vendor point solutions into a grid of interconnected and highly integrated common components that respond to centrally managed instructions or policies.

A common set of policies can be described via various tools and ultimately stored in open formats such as a common XML format to describe run-time policy statements. The enterprise repository (e.g., enhanced service repository 317) may manage this combination of enterprise service metadata and enterprise policies to control and manage connectivity, security, failover, route-away, logging, transformation and translation, orchestration and context based decisioning. The run-time context (real-time performance, cost, availability, quality-of-service (QoS), run-time characteristics such as resource usage and availability) may be measured and fed-back or made available to any node of the service mediation framework or to the enterprise repository itself to enable situation specific actions (context aware decisions).

Examples of the types of metadata stored in enhanced service repository 317 may include the name of a given service request, the network route that needs to be taken to reach a service provider for each service request, logging information related to the service request, the expected amount of time for getting a response to the service request, and the like. In general, metadata may include any piece of information that defines the interaction between a service requestor and a service provider, determines the route that a service request must take to get to a service provider, and/or authenticates or authorizes a service request. The enhanced service repository 317 may also include a list of common functions for a given service and/or the policies that guide the use of these functions. The enhanced service repository 317 may export a file in a standardized format (e.g., XML) that any element (e.g., server) may process. The exported file may include information that allows the servers within a network to communicate about services via common protocols.

The specific service policy information stored in enhanced service repository 317 may be driven by a variety of factors, including which client device 301 is requesting the service, the type of service that the client device 301 is requesting, the time of day, the content of the service request message, and/or an overriding policy of the bank, among other things.

In certain aspects, the enhanced service repository 317 may define enough policies and metadata to cover all or a vast majority of all of the interaction points within an entity such as an organization. In some embodiments, the enhanced service repository 317 may export the policy information for service requests in a standard way. The data stored in and transmitted by the enhanced service repository 317 and/or the enhanced service DNS server 303 may be in a variety of formats, including XML.

In this way, if an organization (e.g., a financial institution, and the like) adds a new feature that depends on a service to its corporate network 300, the wait time for integrating the new feature to the corporate network 300 may be reduced drastically. Also, if changes are made to existing services, these changes may also be implemented in network 300 much more quickly. Thus, potential delays to market share that depend on this new feature may also likewise be reduced.

Figure 4:
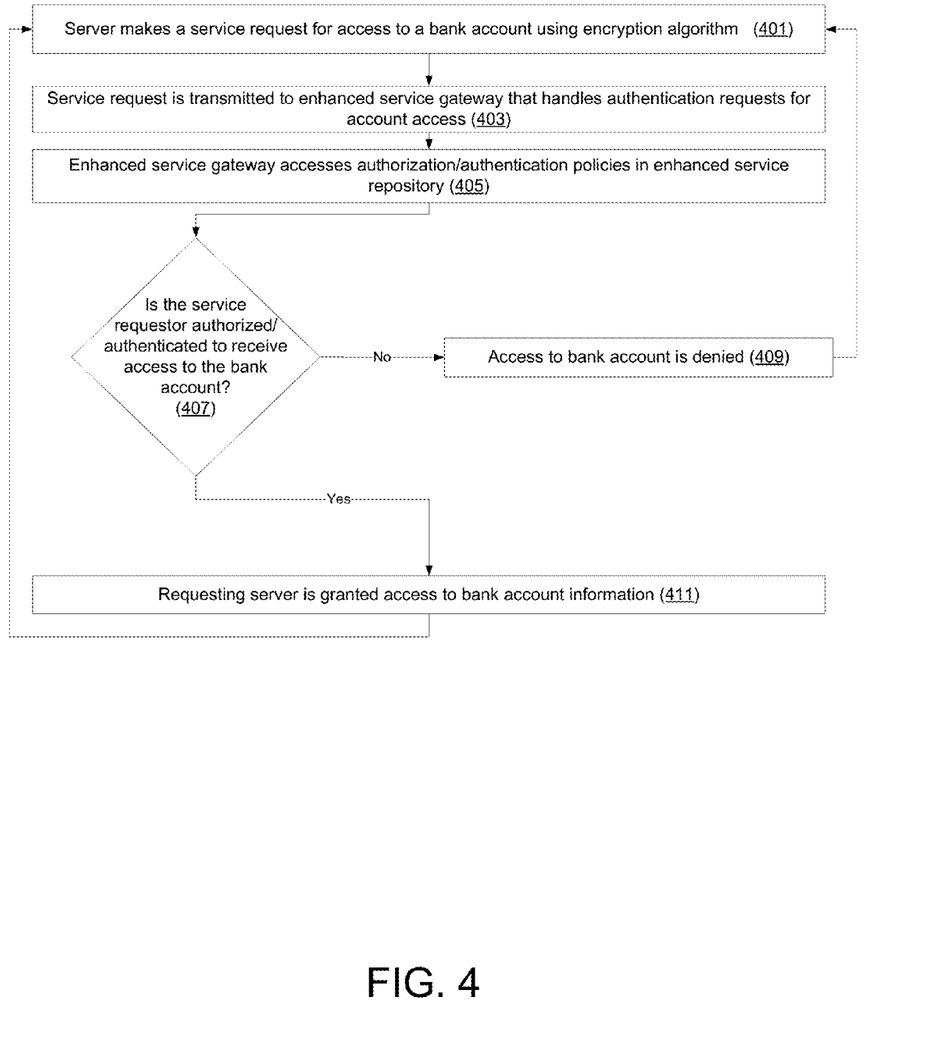
FIG. 4 shows an example method using the service mediation framework in accordance with at least one aspect of the disclosure.

FIG. 4 shows an example method using the service mediation framework, in accordance with certain aspects of the disclosure. The example of FIG. 4 focuses on a service request that involves authorization and authentication of a service request for access to a bank account. The method shown in FIG. 4 may start out at step 401 where a first server (e.g., a client device 301) within the bank may make a first request for access to a bank account using a given message encryption algorithm. The process may then move to step 403 where the service request may be transmitted to an enhanced service gateway (e.g., service gateways 305-313) that handles service requests for access to bank accounts.

Then, in step 405, the appropriate enhanced service gateway 305-313 may then access authentication/authorization policy metadata within enhanced service repository 317 to authenticate and/or authorize the requesting server for access to the bank account. The policies accessed by the enhanced service gateway 305-313 may include verifying the identity credential (e.g., a security token, a cryptographic key, and the like) of the requesting server, entitlement policies for information related to the bank account, and the like.

The process may then move to step 407 where the enhanced service gateway 305-313 may analyze the authentication/authorization service policies retrieved from the enhanced service repository 317 to determine if the service requestor should be given access to information in the bank account.

Assume that in this case one of the policies accessed includes a verification of the encryption algorithm used by the requesting server in the service request for access to the bank account. Assume also that an approved list of encryption algorithms for service requests for accessing bank accounts as stored in enhanced service repository 317 has been recently modified to exclude the type of encryption algorithm used by the requesting server in this case. In this case, the process may then move to step 409 where the enhanced service gateway 305-313 may deny the requesting server access to the bank account based on the use of an unapproved encryption algorithm (e.g., a security risk). The requesting server may then modify the encryption algorithm used to make the service request and resubmit the request in step 401.

Finally, if the requesting server is authorized/authenticated to receive access to information in the bank account, the enhanced service gateway 305-313 may grant the requesting server access to the bank account information in step 411.

In accordance with at least one aspect of the disclosure, an incoming service request may include content which will uniquely identify how to process the transaction. To identify the service mediation implementation, a token may be used to lookup a specific implementation in a shared metadata repository via a specific component, the service repository (both of which may be variations of service repository 317). Information in the service repository may reference the location of a distinct component in the shared metadata repository called the integration specification. The contents of the integration specification may identify all facets of integration between the service consumer and provider and the service mediation framework operates on this set of data for the execution of the mediation.

An example of the dynamic mediation logic captured in the integration specification of the service may be the metadata related to the publication of audit, or logging data. Via the integration specification, the service mediation framework may use bits of data specifically defined for audit to specify an alternative location for auditing as well as the specific data to be sent to the auditing system.

In accordance with aspects of the disclosure, extensible tokens (e.g., a set of computer-readable and/or computer-executable instructions) may be used to provide an integration service to determine and implement relevant policies. Each token may serve as a virtual service gateway and may be valid for a predetermined interval and/or for a predetermined number of service calls, thereby reducing the latencies associated with repeated service calls to a given resource over a period of time. After the predetermined interval has elapsed and/or after the predetermined number of service calls has been reached, a new token may need to be requested by one of the network components. In this way, instead of having a network device (e.g., a service gateway) as the policy enforcement point for each transaction, policies could be enforced once per interval, thereby reducing risk, overhead, and associated cost. In general, tokens establish the system, service, or end-to-end identity across a context. Tokens may be extended to add more information to each context, delivering more and more of the core integration functions that may otherwise be only possible via an in-line (e.g., in the communication path from a service requestor to service provider) service gateway.

Figure 5A:
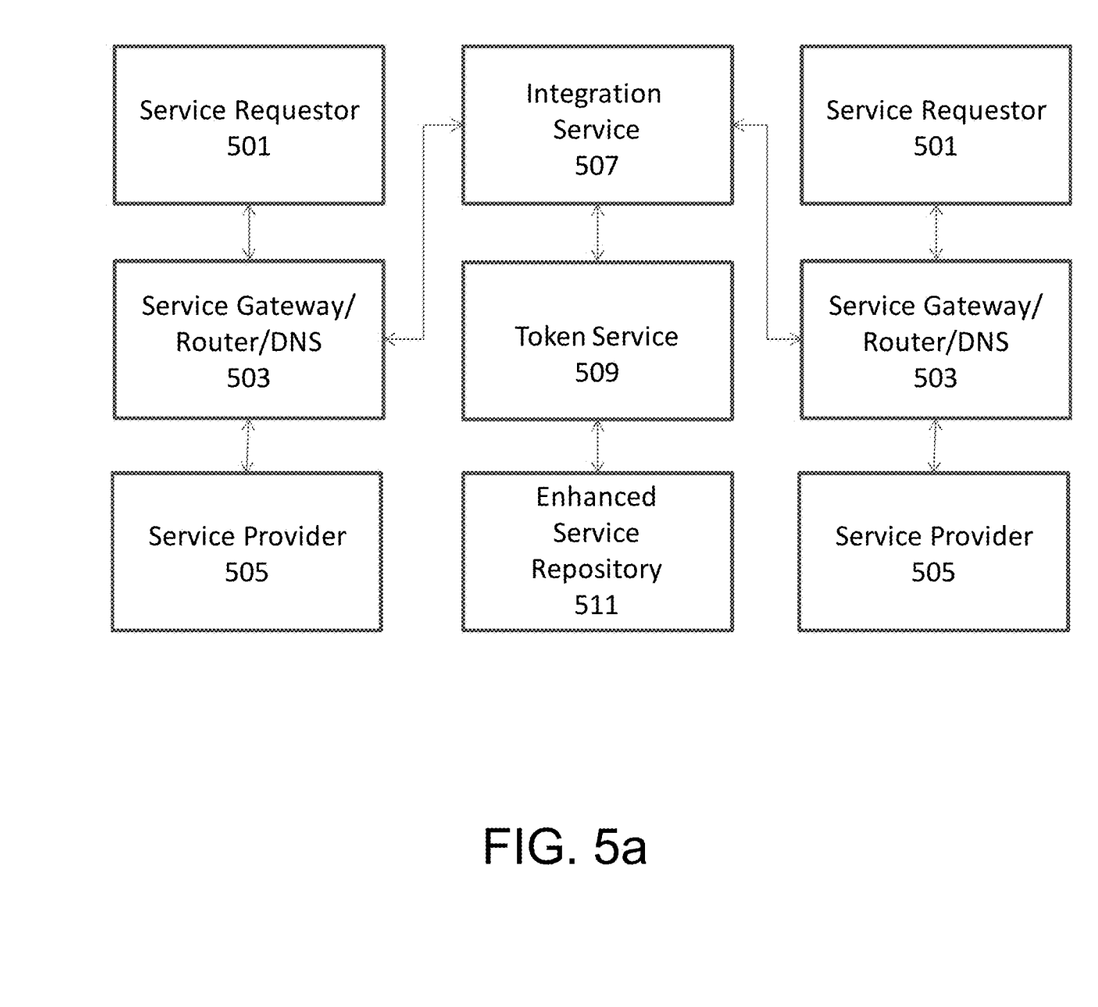
FIG. 5a shows a first implementation of extensible tokens within a service mediation framework, in accordance with at least one aspect of the disclosure.

FIG. 5a shows a first implementation of extensible tokens within a service mediation framework, in accordance with certain aspects of the disclosure. In the example of FIG. 5a, each service requestor 501 may communicate with network components such as service gateways, service routers, and/or service DNSs 503 that lie in the communication path to service providers 505. The service gateway, router, and/or DNS 503 may communicate (e.g., as a token agent for requesting customized tokens via a service call) with a network appliance that offers an integration service 507 to implement relevant policies via extensible tokens. The network appliance that offers the integration service 507 may transmit a token relevant to a given service request by receiving a generic token from a device that offers a token service 509. The token service 509 may transmit a token in a predetermined format with predetermined fields and the relevant set of policies received from enhanced service repository 511 to the integration service 507. The integration service 507 may process the relevant policies and assist the token service to customize the generic token to populate each field of the token with a predetermined value prior to transmitting the customized token to device 503.

The process of creating a customized token for a given service request may involve calculation of complex parameters (e.g., parameters related to where to route, what transformations to make, and the like) based on knowledge of the service requestor, service provider, and policies (e.g., all of the policies associated with the integration functions discussed earlier) associated with the service request.

Once device 503 receives a token responsive to a given service request, device 503 may cache the token in a local memory for future use. Device 503 may also use the information within the token to route the service request to the correct service provider 505. In doing so, device 503 may transmit the token to the next intermediate device (not shown in FIG. 5a) in the communication path to service provider 505. The intermediate device may also cache a copy of the received token prior to transmitting the token to any other intermediate devices (which may similarly cache the received token) in the communication path. In this way, each network device in the communication path to a service provider may maintain a local copy of the token and may access the token when future service requests require access of the information in the token. Thus, as long as a relevant token stored within a network device remains valid, the network device may use the information stored in the token to implement policies such as routing and protocol bridging to communicate with a service provider 505.

In accordance with aspects of the disclosure, a customized token may specify the conditions under which it is valid. For instance, a token may be valid for 100 service requests to the same service provider; alternatively or additionally, a token may be valid for a predetermined length of time (e.g., 30 days). After the token is no longer valid, device 503 may request another token from integration service 507.

Figure 5B:
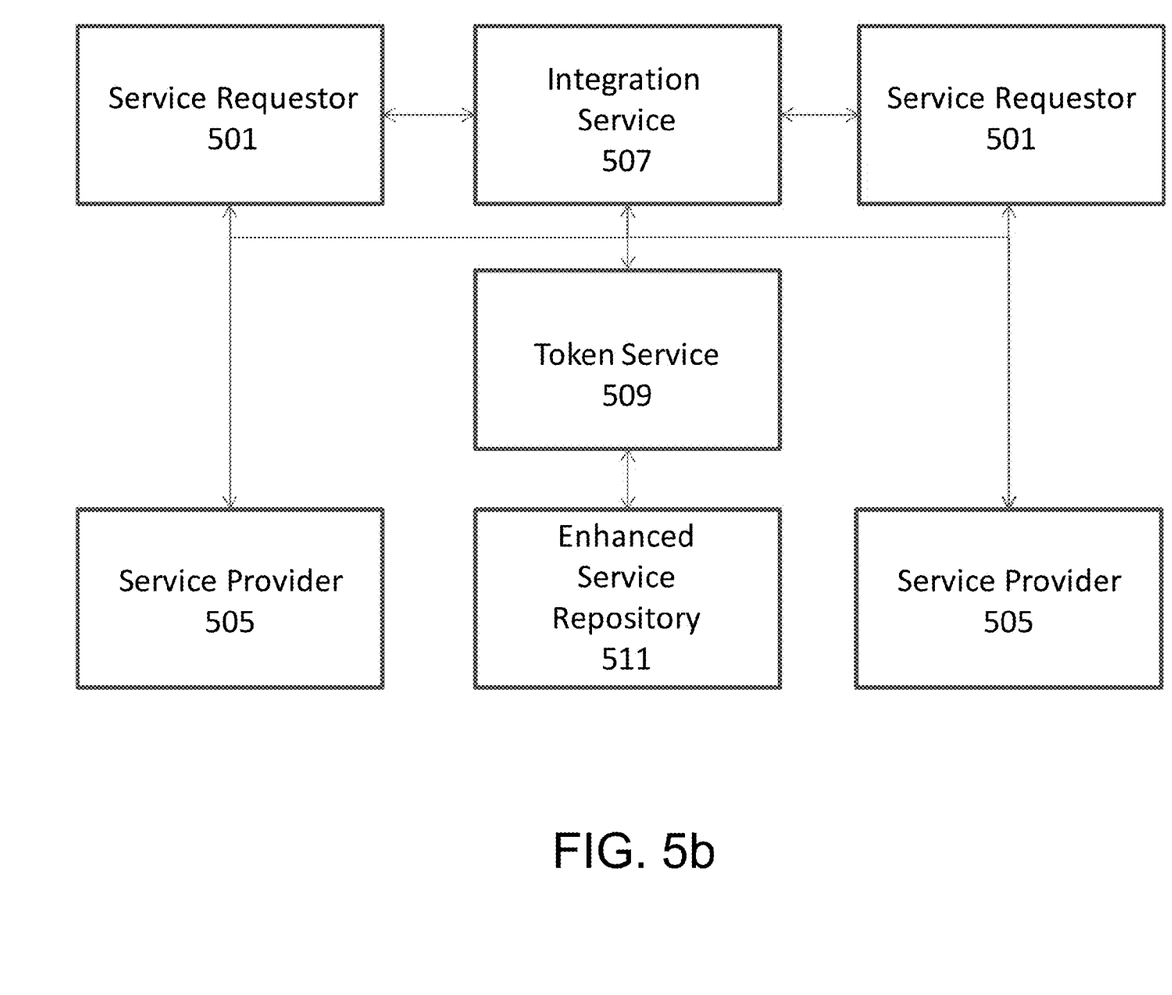
FIG. 5b shows a second implementation of extensible tokens within a service mediation framework, in accordance with at least one aspect of the disclosure.

FIG. 5b shows a second implementation of extensible tokens within a service mediation framework, in accordance with certain aspects of the disclosure. In the example shown in FIG. 5b, service requestors 501 may directly communicate with integration service 507 to cause the generation of a customized token for one or more service requests. As before, integration service 507 may communicate with token service 509 to customize a generic token using policies from enhanced service repository 511. In this example, either the device implementing the integration service 507 or the service requestor 501 (e.g., via customized, re-usable computer-readable instructions executing on integration service 507 or requestor 501) may communicate with the appropriate service provider 505 once a customized token has been generated. If the device implementing the integration service 507 communicates with a service provider 505, the device implementing the integration service 507 may cache each customized token and function both as a token agent and as a service gateway, service router, and/or service DNS 503 for implementing relevant policies for a given service request based on information in the appropriate token. In other embodiments, a customized token may be transmitted from the device implementing integration service 507 to service requestor 501. In this scenario, service requestor 501 may function as a token agent and cache the received token and use the information contained in the token to communicate with the correct service provider 505. In this example, the service requestor 501 may store a software agent that functions to interact with an integration service 507.

Similar to the implementation shown in FIG. 5a, the tokens generated through the implementation shown in FIG. 5b may specify the conditions (e.g., length of time, number of service calls, and the like) under which the token is valid.

One of ordinary skill in the art would understand that devices 501-511 shown in FIGS. 5a and 5b may include one or more components of enhanced network services device 101.

Through implementation of tokens and a token service, aspects of the disclosure allow for dramatic reduction of overhead from integration and the generation of new modes of operation such as transaction tracing via a trace token and/or cost, performance, or availability-based routing. For instance, a token may store information related to the path that the token traversed to complete each service request (e.g., a transaction), the performance (e.g., time, reliability, and the like) of each network component in completing each step of the service request, and the function accomplished at each network component during each step of the service request. Once a token has stored all of this information, the token service 509 may cause display of the information onto a dashboard for easy analysis by users. In this way, a token may serve as a trace token to allow users to determine the performance, cost, and availability of network components in the service pathway during the lifecycle of the service request. Using the information gathered by the token and displayed on the dashboard, future service requests may be routed differently to increase performance, reduce cost, and the like.

Figure 6:
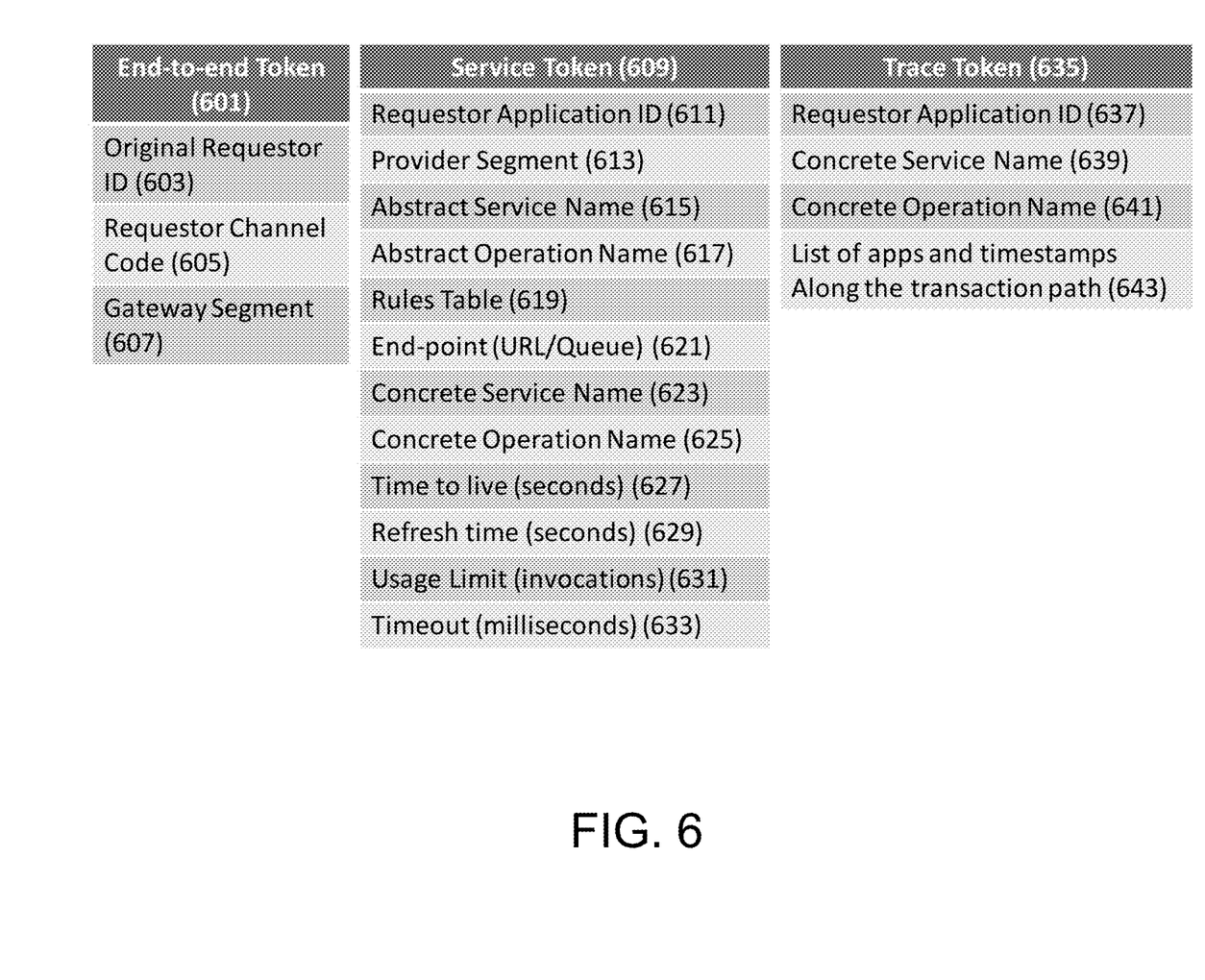
FIG. 6 shows various fields that may be a part of three different types of tokens, in accordance with at least one aspect of the disclosure.

FIG. 6 shows various fields that may be a part of three different types of tokens, in accordance with certain aspects of the disclosure. In particular, FIG. 6 depicts fields that may be a part of an end-to-end token 601, service token 609, and a trace token 635. An end-to-end token 601 may include an original requestor ID field 603, a requestor channel code field 605, and a gateway segment field 607. The original requestor ID field 603 may represent an identification associated with a service requestor application (e.g., a serial number of an application located at a predetermined branch of a company at a predetermined location). The requestor channel code field 605 may represent the type of channel (e.g., classification) used by the requesting application (e.g., branch location, automated teller machine (ATM), mobile device, and the like). The gateway segment field 607 may represent the segment (e.g., physical location of network components) of network infrastructure used by the service requestor to transmit a request to a given service provider (e.g., to isolate unrelated network traffic within different segments).

A service token 609 may include a requestor application ID field 611, provider segment field 613, abstract service name field 615, abstract operation name field 617, rules table field 619, end-point field 621, concrete service name field 623, concrete operation name field 625, time to live field 627, refresh time field 629, usage limit field 631, and timeout field 633. The requestor application ID field 611 may represent an identification associated with a service requestor application (e.g., application located at a predetermined branch of a company at a predetermined location).

The requestor application ID field 611 of the service token 609 may be the same as the original requestor ID field 603 of the end-to-end token 601 for the first "hop" of a transaction pathway. For instance, if an application stored on a computing device associated with a bank teller transmits a first service request to open an account to a first network component (e.g., a customer database) and the first network component in turn transmits a second service request to a second network component (e.g., credit card account database), each network component (or associated application) will have an associated requestor ID. For the first hop of the transaction pathway in this example, the original requestor ID field 603 and the requestor application ID field 611 will be the same (e.g., the ID associated with the application stored on the computing device associated with the bank teller). For the second hop of the transaction pathway in this example, the original requestor ID field 603 and the requestor application ID field 611 will be different; in particular, the original requestor ID field 603 will remain the ID associated with the application stored on the computing device associated with the bank teller whereas the requestor application ID field 611 will be the ID associated with a relevant application in the customer database that calls an application within the credit card account database. In this way, the values of fields 603-607 within end-to-end token 601 may persist over the entire transaction pathway whereas the values of fields 611-633 of service token 609 may change from hop to hop of the transaction pathway.

The provider segment field 613 may represent a pool of gateways (or an endpoint for a given pool of gateways) through which a service request must travel to arrive at a given service provider (e.g., a first pool of gateways associated with a given branch location in a first state versus a second pool of gateways associated with a given branch location in a second state). The abstract service name field 615 may represent an easy-to-understand name (e.g., open an account) associated with a service being requested by a service requestor. The abstract operation name field 617 may represent an easy-to-understand sub-category (e.g., open a fixed interest rate account, open a variable interest rate account, and the like) under the abstract service name field 617.

The rules table field 619 may represent a list of information (e.g., an XML table provided by a service requestor to an integration service 507 that includes metadata to distinguish between various service names/operation names) that may be used by integration service 507 to map between a concrete and abstract service name and/or between a concrete and abstract operation name.

The end-point field 621 may represent the address (e.g., uniform resource locator (URL) and/or queue) of the end-point for providing a concrete service and/or operation. The concrete service name field 623 may represent the specific service name (e.g., open credit card account) associated with a service being requested by a service provider. The concrete operation name field 625 may represent the specific operation name (e.g., open a credit card account with a fixed interest rate, open a credit card account with a variable interest rate, and the like) associated with a service being requested by a service provider.

The time to live field 627 may represent the amount of time (e.g., in seconds) for which a given service request is valid. The refresh time field 629 may represent the amount of time (e.g., in seconds) after which the service token 609 may need to be refreshed with a new token. The usage limit field 631 may represent the maximum number of invocations of a service specified by service token 609 after which the service token 609 may need to be refreshed with a new token. The timeout field 633 may represent the amount of time (e.g., in milliseconds) that a service requestor should wait for a response to a given service request.

A trace token 635 may include a requestor application ID field 637, concrete service name field 639, concrete operation name field 641, and a list of applications and timestamps along the transaction path field 643. The requestor application ID field 637 of trace token 635 may include the same information as the requestor application ID field 611 of service token 609. The concrete service name field 639 of trace token 635 may include the same information as the concrete service name field 623 of service token 609. The concrete operation name field 641 of trace token 635 may include the same information as the concrete operation name field 625 of service token 609. Finally, the list of applications and timestamps along the transaction path field 643 may represent an up-to-date list of service requestor applications and timestamps associated with these applications for each service requestor up to a given hop in the transaction path. Using this field, as a service request is transmitted to each successive hop, the list of service requestor applications and timestamps along the transaction path field 643 is extended with the service requestor application and timestamp information for that hop.

Each of the tokens mentioned above may be digitally signed to prevent tampering. Also, each token may be cached at different points along the transaction pathway. For instance, the end-to-end token 601 may be cached at the first hop (e.g., a service gateway) in the transaction pathway. Meanwhile, a different service token 609 may be cached at each hop of the transaction pathway (e.g., because the requestor application ID changes from one hop to the next). A different trace token 635 may be cached at each service provider in a transaction pathway (e.g., because the list of service requestor applications and timestamps along the transaction path field 643 is extended at each successive hop of the transaction path).

In addition to the three tokens mentioned above, aspects of the disclosure also allow for the use of system certificates which may include various fields related to authentication. For instance, a system certificate may include fields related to a system ID (e.g., an identifier associated with a hardware component that represents a given service requestor) and/or a test/production indicator (e.g., an indicator that prevents a test system from calling a production provider and vice versa). System certificates may be cached at a service requestor and may prevent man-in-the-middle attacks (e.g., mutual secure socket layer (SSL) or authentication).

One of ordinary skill in the art would understand that tokens 601, 609, and 635 and system certificates may include additional or alternative fields that allow the tokens/certificates to implement each function of an integration service 507.

It should be noted that the term policy, as used throughout this disclosure, may be a generalization that describes the definition of any run-time decision or action driven by an implicit decision (automatically without any pre-configuration on the part of the user) or an explicit decision (driven by the presence of content in the request or via configuration of metadata in a repository or system of record where the threshold or data to drive that action is maintained).

Embodiments of the disclosure allow for the creation of a run-time agent in any language or programming construct running on any platform that can understand and execute a given policy or conditional run-time action driven by either content in the message or response, by context based on local measurement of conditions, or via configuration and relationships between associated data elements or objects. This agent may then act on a service token or similar policy token which contains policy information such as routing, transformation, or SLA management data. Any intermediate agent may identify the context of the message and inject a suitable service or policy token for action either within that node or on a node downstream from that node that will later interact with the message.

In addition, any number of design-time systems or tools may be created that allow both the definition of policy or run-time actions, groups, or bundles and their association with service objects such as the service requestor, service provider, the service, the operation, or some combination of the four (often called the service contract).

Policies may also be expressed in any number of industry standard or proprietary policy dialects. If expressed in these formats, the policy may be more readily reused and attached across diverse systems, but this complicates the application of logic to limit the possible combinations and attachments of policies to service objects. Keeping the policies as centralized configurations defining relationships within a single user interface may afford the ability to manage all interactions and combinations assuring that only valid, certified, pretested, or desired combinations or attachments are permitted.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable storage medium having computer-executable program instructions stored thereon that when executed by a processor, cause the processor to perform:

(a) receiving, by a service router from a client device associated with a service requestor, a service request associated with a service implemented by at least one of a plurality of service providers;

(b) analyzing, by the service router, information within the service request to determine at least one policy for handling the service request based on information stored in an enhanced service repository;

(c) determining, by the service router, whether there exists, in a cache of the service router, a valid token associated with the service and the at least one policy;

(d) responsive to a determination that no valid token exists, transmitting, by the service router, the service request to an integration service;

(e) receiving, by the integration service, a generic token having a plurality of fields from a token service;

(f) generating, by the integration service, from the generic token, a customized token by populating each field of the generic token based, at least in part, on information within the service request and the at least one policy;

(g) receiving, by the service router from the integration service, the customized token for handling the service request;

(h) caching the customized token by the service router; and (i) routing, by the service router, the customized token to one of the plurality of service providers.

2. The non-transitory computer-readable storage medium of claim 1, wherein the service request includes an Extensible Markup Language (XML) table with rules for distinguishing between a plurality of services.

3. The non-transitory computer-readable storage medium of claim 1, wherein the service request is chosen from the group consisting of: opening a bank account, registering for a credit card, and applying for a loan.

4. The non-transitory computer-readable storage medium of claim 1, wherein the customized token includes a requestor application ID field, a provider segment field, an abstract service name field, and a concrete service name field.

5. The non-transitory computer-readable storage medium of claim 1, wherein the customized token includes a time to live field, a refresh time field, a usage limit field, and a timeout field.

6. The non-transitory computer-readable storage medium of claim 1, wherein the customized token comprises a service token.

7. The non-transitory computer-readable storage medium of claim 1, wherein the analyzing comprises determining an address of the service provider associated with the service request.

8. The non-transitory computer-readable storage medium of claim 1, wherein the customized token is valid for a predetermined number of service requests.

9. The non-transitory computer-readable storage medium of claim 8, wherein the processor further performs: after the predetermined number of service requests, receiving a new customized token from the integration service.

10. The non-transitory computer-readable storage medium of claim 1, wherein the customized token is valid for a predetermined length of time.

* * * * *